Sept. 10, 1929.　　G. B. GALLASCH　　1,727,875
DRILL GAUGE
Filed May 27, 1927
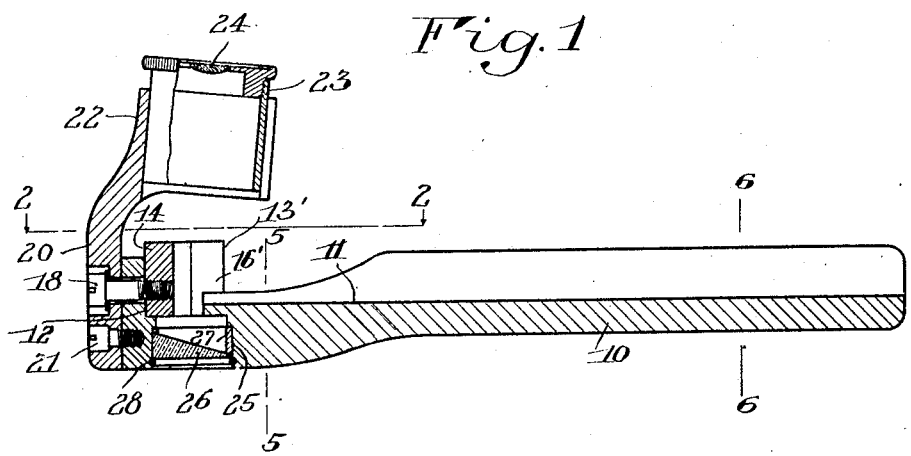
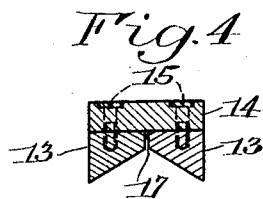
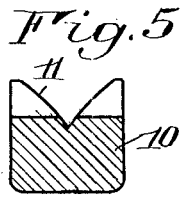
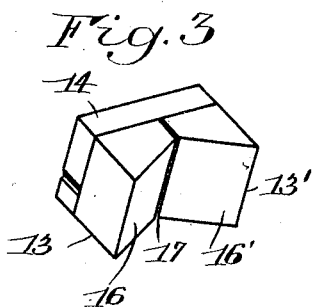
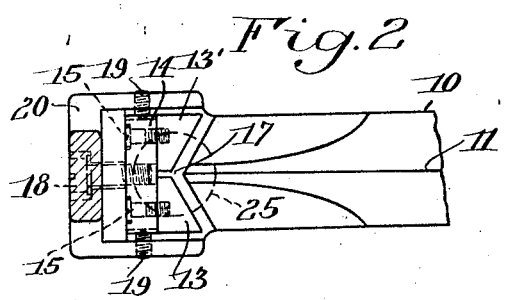
GEORGE B. GALLASCH,
INVENTOR
BY
his ATTORNEYS Patented Sept. 10, 1929.

1,727,875

UNITED STATES PATENT OFFICE.

GEORGE B. GALLASCH, OF ROCHESTER, NEW YORK, ASSIGNOR TO BAUSCH & LOMB OPTICAL COMPANY, OF ROCHESTER, NEW YORK, A CORPORATION OF NEW YORK.

DRILL GAUGE.

Application filed May 27, 1927. Serial No. 194,699.

This invention relates to improvements in devices which are used by mechanics for the purpose of checking and verifying the accuracy of various machine tools. More particularly, it has reference to a gauging device which is used for checking the accuracy of a twist drill.

One of the objects of the present invention is to provide a drill gauge which shall be simple and rugged in structure.

Another object is to provide a drill gauge having reflecting means cooperating with the gauging means whereby the sensitiveness of the instrument is increased.

Another object is to provide a drill gauge which can be quickly and conveniently used for the purpose of checking the angle and the concentricities of the web and dead center of a twist drill.

Other objects and advantages reside in certain novel features of construction, arrangement and combination of parts, which will hereinafter be more fully described and pointed out in the appended claims.

Referring to the drawings:

Figure 1 shows a longitudinal sectional view of my improved drill gauge, with parts in elevation;

Figure 2 shows a view partly in section and partly in elevation taken on line 2—2 and looking in the direction of the arrows;

Figure 3 shows a perspective view of the gauging block assembly;

Figure 4 shows a horizontal sectional view of the gauging block assembly; and

Figures 5 and 6 are sectional views of the bearing member taken on lines 5—5 and 6—6, respectively.

A preferred embodiment of my drill gauge, shown in Figure 1, comprises a main bearing member 10 having a V-shaped groove 11 adapted to receive a tool, such as a twist drill, for the purposes of inspection and checking for accuracy. One end of the member 10 is provided with a recess as at 12 in order to form a seating for the gauging block assembly shown in perspective in Figure 3.

The gauging block assembly, shown in Figure 3, comprises two prismoidal members 13, 13' which are secured to a block 14 by means of countersunk screws 15. The two members 13, 13' have angularly disposed faces 16, 16' which are brightly polished to produce reflecting surfaces. As clearly shown in Figures 2, 3 and 4, the two prismoidal members 13, 13' are spaced to provide a narrow slit 17 which is about two-thousandths of an inch in width, though shown exaggerated on the drawings. In the preferred embodiment, the prismoidal members are made of hardened steel which can be polished to produce a reflecting surface, but it is obvious that other materials capable of affording a reflecting surface, could also be used.

The gauging block assembly is held in place by means of a screw 18 which is threaded into block 14 of the gauging block assembly and draws the rear face of block 14 into contact with the rear wall of recess 12, thus securing the gauging block assembly firmly in position, as shown in Figures 1 and 2. Screws 19 are threaded into member 20 and engage the sides of block 14 to provide a means for laterally adjusting the gauging block assembly, the openings through which screw 18 passes being slightly oversize in order to permit of this adjustment.

The member 20, secured to body member 10 by means of screws 21, has a tubular portion 22 which overhangs the block assembly. An eyepiece, 23 carrying a magnifying lens 24, is slidably mounted in the tubular portion to provide for focusing the optical system. The optical axis of the lens system is slightly inclined from the vertical for a purpose which will hereinafter be explained.

An opening 25 is provided beneath the recess 12 of the body member 10 so as to afford a through passage for light rays from the under side of member 10 to the slit 17 of the gauging block assembly. A prism 26, mounted in the opening 25, bears against the truncated tubular spacing member 27 and is held in place by a spring ring 28. The outer face of prism 26 is preferably ground so as to produce diffusion of the entering light rays.

In using the device, the twist drill to be inspected is placed in the longitudinal groove 11 with the tip end of the drill contacting with the angularly disposed faces of the gauging block assembly. The device is then held up to a source of light so that light rays may pass through the prism 26 and upwards through the narrow slit 17. Thus a very narrow beam of light is produced at the vertex of the angle formed by the two faces 16, 16' of the prismoidal members 13, 13'.

The prism 26, with outer surface ground, affords greater convenience, especially in using the device in connection with a source of artificial illumination. Thus with the prism, it is not necessary to hold the device so that the slit 17 points directly at the light source, since light rays incident upon the outer surface of the prism 26 at an angle will be refracted by the prism so as to illuminate the slit 17. The prism 26 could be replaced by a piece of ground glass having plane parallel surfaces and although the gauge would function properly, such an arrangement would render the gauge less convenient in use.

The sharp edge at the extreme tip end of a twist drill is known as the dead center. In a properly ground twist drill this sharp edge or dead center will always lie in a plane which is coincident with the axis of the drill. The length of this sharp edge is known as the web, and in a correctly ground drill the web is symmetrical with respect to the axis of the drill. Both the concentricity of the dead center and the concentricity of the web may be readily checked by means of my improved device.

In checking the concentricity of the dead center, it is only necessary to place the drill in the longitudinal groove 11 with the point of the drill against the gauging block and with the drill turned so that the dead center, or sharp edge, is perpendicular to the vertex line of groove 11. Then by holding the gauge up to a source of light, the narrow slit 17 is illuminated and serves as a centrally located reference line, by means of which it is possible to check the concentricity of the dead center of the drill. The slit 17 and the vertex line of the V-shaped groove 11 lie in the same plane, and by placing a drill in the groove 11 the axis of the drill will also necessarily coincide with the same plane and hence the location of the dead center with respect to the axis of the drill can be determined.

Upon looking through the magnifying system in checking a drill for concentricity of dead center, three images are seen. One is the direct magnified image of the drill itself and the other two are images which are reflected in the polished surfaces 16, 16' of the gauging block assembly and are visible because the optical axis of the magnifying lens 24 is inclined at an angle with the vertical planes of the reflecting surfaces. If the drill is properly ground, the three images will appear symmetrically arranged with respect to the narrow slit 17 at the vertex of the angle of the gauging block assembly and the images of the dead center will all come together at the vertex. If the dead center is not in line with the axis of the drill, the three images will not be symmetrically arranged with respect to the vertex slit 17.

For checking the web, the end of the drill is placed in contact with the gauging block assembly with the web in a horizontal plane. If the web is properly located, the three images will form an equilateral triangle which is closed except at the vertex where the narrow illuminated slit is located.

The efficient operation of a twist drill is dependent upon the angle between the cutting lips, and for ordinary purposes an angle of 59 degrees is quite generally accepted and recommended. This angle may also be checked by means of my gauge and for this purpose the reflecting surfaces 16 and 16' are arranged to form an angle of 59 degrees with each other. Hence, by placing the cutting lips in contact with the angularly disposed surfaces 16 and 16' it is possible to ascertain whether or not the lip angle of the drill is of the proper magnitude. Certain classes of work require various different lip angles and it is to be understood that the gauging block assembly may be provided with surfaces 16 and 16' arranged at various desired angles.

When an object is reflected in a plane surface, the image of the object appears to be behind the surface the same distance as the object is in front of the surface. This fact is utilized in my drill gauge for the purpose of increasing its sensitiveness and forms an important feature of the present invention. Thus, since two reflected images of the drill are observed, any irregularity will appear to be twice as great as it actually is. For instance, in checking the concentricity of the dead center of an improperly centered drill, the true image and the two reflected images would not all meet at the vertex slit 17, as one of the reflected images would appear as spaced from the other two and this spacing would be twice the amount of the actual error or irregularity of the drill. Hence, the reflecting surfaces 16 and 16' are an essential part of the present invention and the optical axis of the lens 24 is inclined from the vertical so that the images may be viewed in the reflecting surfaces.

From the foregoing, it will be apparent that I am able to attain the objects of the invention and provide a drill gauge which will be simple and rugged of structure and yet possess a relatively high degree of sensitiveness, so that the instrument will afford an efficient and convenient means for gauging and checking the dead center, web and lip angle of a drill. The specification and drawing are to be interpreted as illustrative only and not in any limiting sense.

I claim as my invention:

1. A drill gauge comprising a grooved bearing member adapted to receive a drill, angularly disposed reflecting surfaces positioned adjacent one end of said member, said reflecting surfaces lying substantially in planes intersecting each other in a line substantially perpendicular to the axis of said grooved bearing member, and an optical system positioned above said surfaces, the axis of said system being inclined to said line so that both the end of a drill positioned in said bearing member and the reflection thereof in said reflecting surfaces may be observed through said optical system.

2. A drill gauge comprising a bearing member having a V-shaped groove adapted to receive a drill, gauging means positioned adjacent one end of said member, said means comprising spaced angularly disposed reflecting surfaces, the vertex of the angle formed by said surfaces being perpendicular to the vertex of the angle of said groove.

3. A drill gauge comprising a grooved member adapted to receive a drill, gauging means positioned adjacent one end of said member, said means comprising two angularly disposed reflecting surfaces, said surfaces being spaced to provide a narrow slit at the vertex of the angle formed by said surfaces, said slit being perpendicular to said groove.

4. A drill gauge comprising a bearing member adapted to receive a drill, a gauging device positioned adjacent one end of said member, said device comprising vertically disposed reflecting means, and an optical system mounted above said device, the optical axis of said system being inclined to said reflecting means.

5. A drill gauge comprising a bearing member having a V-shaped groove adapted to receive a drill, gauging means positioned adjacent one end of said member, said means comprising a pair of spaced blocks having angularly disposed reflecting surfaces, the vertex of the angle formed by said surfaces being perpendicular to the groove of said member.

6. A drill gauge comprising a bearing member having a V-shaped groove adapted to receive a drill, gauging means positioned adjacent one end of said member, said means comprising a pair of blocks having reflecting surfaces disposed to form an angle whose vertex is perpendicular to the groove of said member, said blocks being spaced to form a narrow slit which is perpendicular to the groove of said member, a prism arranged below said slit and an optical system positioned above said slit, the optical axis of said system being inclined to said slit.

GEORGE B. GALLASCH.